(12) United States Patent
Figgins

(10) Patent No.: US 10,820,499 B2
(45) Date of Patent: Nov. 3, 2020

(54) HYBRID DISC CUTTING SYSTEM HAVING A KNIFE MOUNT FOR AN AGRICULTURAL VEHICLE

(71) Applicant: CNH INDUSTRIAL AMERICA LLC, New Holland, PA (US)

(72) Inventor: Ryan Marcus Figgins, New Holland, PA (US)

(73) Assignee: CNH Industrial America LLC, New Holland, PA (US)

(*) Notice: Subject to any disclaimer, the term of this patent is extended or adjusted under 35 U.S.C. 154(b) by 33 days.

(21) Appl. No.: 16/004,136

(22) Filed: Jun. 8, 2018

(65) Prior Publication Data

US 2019/0373810 A1    Dec. 12, 2019

(51) Int. Cl.
*A01D 34/66* (2006.01)
*A01D 34/73* (2006.01)

(52) U.S. Cl.
CPC ......... *A01D 34/662* (2013.01); *A01D 34/733* (2013.01)

(58) Field of Classification Search
CPC .. A01D 34/662; A01D 34/733; A01D 34/664; A01D 34/665; A01D 34/828; A01D 34/17; A01D 34/66; Y10T 29/4973; Y10T 29/49721; Y10S 56/20
See application file for complete search history.

(56) References Cited

U.S. PATENT DOCUMENTS

| | | | |
|---|---|---|---|
| 139,612 A | 6/1873 | Rarigh | |
| 149,670 A | 4/1874 | Mitten et al. | |
| 871,203 A | 11/1907 | Burhop | |
| 1,206,642 A | 11/1916 | Alchevsky | |
| 3,469,378 A * | 9/1969 | Heesters | A01D 75/185 56/11.9 |
| 3,604,189 A * | 9/1971 | Harer | A01D 34/664 56/295 |
| 3,662,529 A * | 5/1972 | Glunk | A01D 34/733 56/295 |
| 3,958,402 A * | 5/1976 | Bouet | A01D 34/63 56/295 |

(Continued)

FOREIGN PATENT DOCUMENTS

| EP | 0057936 A2 * | 8/1982 | ............ A01D 34/66 |
|---|---|---|---|
| EP | 0115853 A1 | 8/1984 | |

(Continued)

OTHER PUBLICATIONS

Extended European Search Report for EP Application No. 19178807.4 dated Nov. 4, 2019 (10 pages).

(Continued)

*Primary Examiner* — Arpad Fabian-Kovacs
(74) *Attorney, Agent, or Firm* — Patrick Sheldrake; Peter Zacharias

(57) ABSTRACT

An agricultural vehicle includes a chassis and a header carried by the chassis. The header includes a cutterbar with at least one cutting unit. The at least one cutting unit includes a rotary driver; a rotatable disc coupled to the rotary driver; at least one knife mount coupled to a disc surface of the rotatable disc and including a locking portion biased toward the disc surface; and a knife locked in at least one direction by the locking portion, the knife defining at least one cutting edge.

20 Claims, 4 Drawing Sheets

(56) References Cited

U.S. PATENT DOCUMENTS

| | | | | |
|---|---|---|---|---|
| 4,313,297 | A | * | 2/1982 | Maier ................ A01D 34/733 56/295 |
| 4,345,420 | A | * | 8/1982 | Oosterling ............ A01D 34/66 56/192 |
| 4,426,827 | A | * | 1/1984 | Oosterling ........... A01D 34/664 56/13.6 |
| 4,525,990 | A | * | 7/1985 | Zweegers ............ A01D 34/736 56/295 |
| 5,487,259 | A | * | 1/1996 | Powers ................ A01D 34/17 411/348 |
| 5,784,866 | A | * | 7/1998 | Campbell ............ A01D 34/665 56/13.6 |
| 6,829,878 | B1 | | 12/2004 | Hoffman |
| 8,020,363 | B1 | * | 9/2011 | Barnett ............... A01D 34/665 56/17.4 |
| 8,695,316 | B2 | | 4/2014 | Pruitt et al. |
| 9,420,742 | B2 | | 8/2016 | Martinez |
| 9,717,175 | B2 | * | 8/2017 | Fay, II ................ A01D 34/665 |
| 9,788,483 | B2 | | 10/2017 | Roth et al. |
| 2005/0016150 | A1 | * | 1/2005 | Thompson ........... A01D 34/733 56/295 |
| 2009/0205305 | A1 | * | 8/2009 | Koorn ................. A01D 34/733 56/13.6 |
| 2010/0205925 | A1 | * | 8/2010 | Thompson ........... A01D 34/733 56/255 |
| 2011/0194885 | A1 | * | 8/2011 | Whitenight .......... A01D 34/733 403/11 |
| 2012/0318114 | A1 | | 12/2012 | Esain Eugui |
| 2013/0055546 | A1 | | 3/2013 | Fay, II |
| 2014/0126952 | A1 | * | 5/2014 | Fay, II ................ A01D 34/733 403/161 |
| 2015/0305235 | A1 | * | 10/2015 | Fay, II ................ A01D 34/733 56/295 |

FOREIGN PATENT DOCUMENTS

| | | |
|---|---|---|
| EP | 0809929 A1 | 12/1997 |
| EP | 2727450 A1 | 5/2014 |
| EP | 3143865 A2 | 3/2017 |

OTHER PUBLICATIONS

Extended European Search Report for EP19178807.4 dated Jan. 14, 2020 (seven pages).

* cited by examiner

HYBRID DISC CUTTING SYSTEM HAVING A KNIFE MOUNT FOR AN AGRICULTURAL VEHICLE

BACKGROUND

Agricultural vehicles such as mowers, combine harvesters, windrowers, and forage harvesters, are equipped with one or more cutting elements to sever crops and other plant material in a field. Many different styles of cutting elements exist, depending on the application and desired cut characteristics. Mowers for cutting hay, for example, may be equipped with disc-type cutting elements that rotate to cut hay as the mower travels across the field. Alternatively, the mower may be equipped with sickle-type cutting elements that reciprocate to cut crop material as the mower travels across a field.

SUMMARY

The present disclosure relates to a header for an agricultural vehicle with a knife mount having a locking portion biased toward a disc surface of a rotatable disc to lock a knife.

In some exemplary embodiments disclosed herein, an agricultural vehicle, includes a chassis and a header carried by the chassis. The header includes a cutterbar with at least one cutting unit. The at least one cutting unit includes a rotary driver; a rotatable disc coupled to the rotary driver; at least one knife mount coupled to a disc surface of the rotatable disc and including a locking portion biased toward the disc surface; and a knife locked in at least one direction by the locking portion, the knife defining at least one cutting edge.

In some exemplary embodiments disclosed herein, a header for an agricultural vehicle includes: a header frame; a rotary driver carried by the header frame; a rotatable disc coupled to the rotary driver; and at least one knife mount coupled to a disc surface of the rotatable disc and having a locking portion biased toward the disc surface to lock a knife in at least one direction.

In some exemplary embodiments disclosed herein, a method of mounting a knife in a header for an agricultural vehicle is provided. The header includes a rotatable disc and a knife mount coupled to the rotatable disc. The method includes: forcing a locking portion of the knife mount away from a disc surface of the rotatable disc, the locking portion being biased toward the disc surface; placing the knife adjacent to the disc surface; and releasing the locking portion such that the locking portion travels toward the disc surface and locks the knife in at least one direction.

One possible benefit that may be realized by exemplary embodiments disclosed herein is the knife mount allows a knife to be quickly and easily installed or, if the knife dulls or breaks, replaced.

Another possible benefit that may be realized by exemplary embodiments disclosed herein is the knife may be pivotably locked in a knife slot so the knife does not pivot during cutting, which can improve cut quality.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the disclosed harvester and header, reference is made to the accompanying figures, wherein.

DETAILED DESCRIPTION

Various terms relating to the methods and other aspects of the present disclosure are used throughout the specification and claims. Such terms are to be given their ordinary meaning in the art unless otherwise indicated. Other specifically defined terms are to be construed in a manner consistent with the definition provided herein.

As used in this specification and the appended claims, the singular forms "a," "an," and "the" include plural referents unless the content clearly dictates otherwise.

The term "plurality" as used herein is defined as any amount or number greater or more than 1. In some embodiments, the term "plurality" means 2, 3, 4, 5, 6 or more.

The terms "left" and "right" are used herein as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes or axes.

The terms "crops" and "crop material" are used herein to refer to any type of plant and/or vegetation that is intentionally planted for collection. Exemplary crops and crop material may include hay, wheat, and corn, but it should be appreciated that the embodiments disclosed herein are not limited to applications for collecting crops and crop material. Embodiments disclosed herein may be used, for example, to mow a field and sever other types of plant material such as grass, various varieties of weeds, etc.

The term "agricultural vehicle" is used herein to refer to an assembly of various elements that work in conjunction to travel and perform various tasks related to agriculture, such as removing crops, crop material, or other plant material from a field. Exemplary agricultural vehicles include, but are not limited to, vehicles that are commonly referred to as mowers, windrowers, spreaders, windrow inverters, and combine harvesters.

Many of the fastening, connection, processes and other components utilized in this disclosure are widely known and used in the field of the disclosure described, and their exact nature or type is not necessary for an understanding and use of the disclosure by a person skilled in the art, and they will not therefore be discussed in significant detail. Furthermore, the various components shown or described herein for any specific application of this disclosure can be varied and the practice of a specific application of any element may already be widely known or used in the art by persons skilled in the art and each will likewise not therefore be discussed in significant detail.

Figure 1:
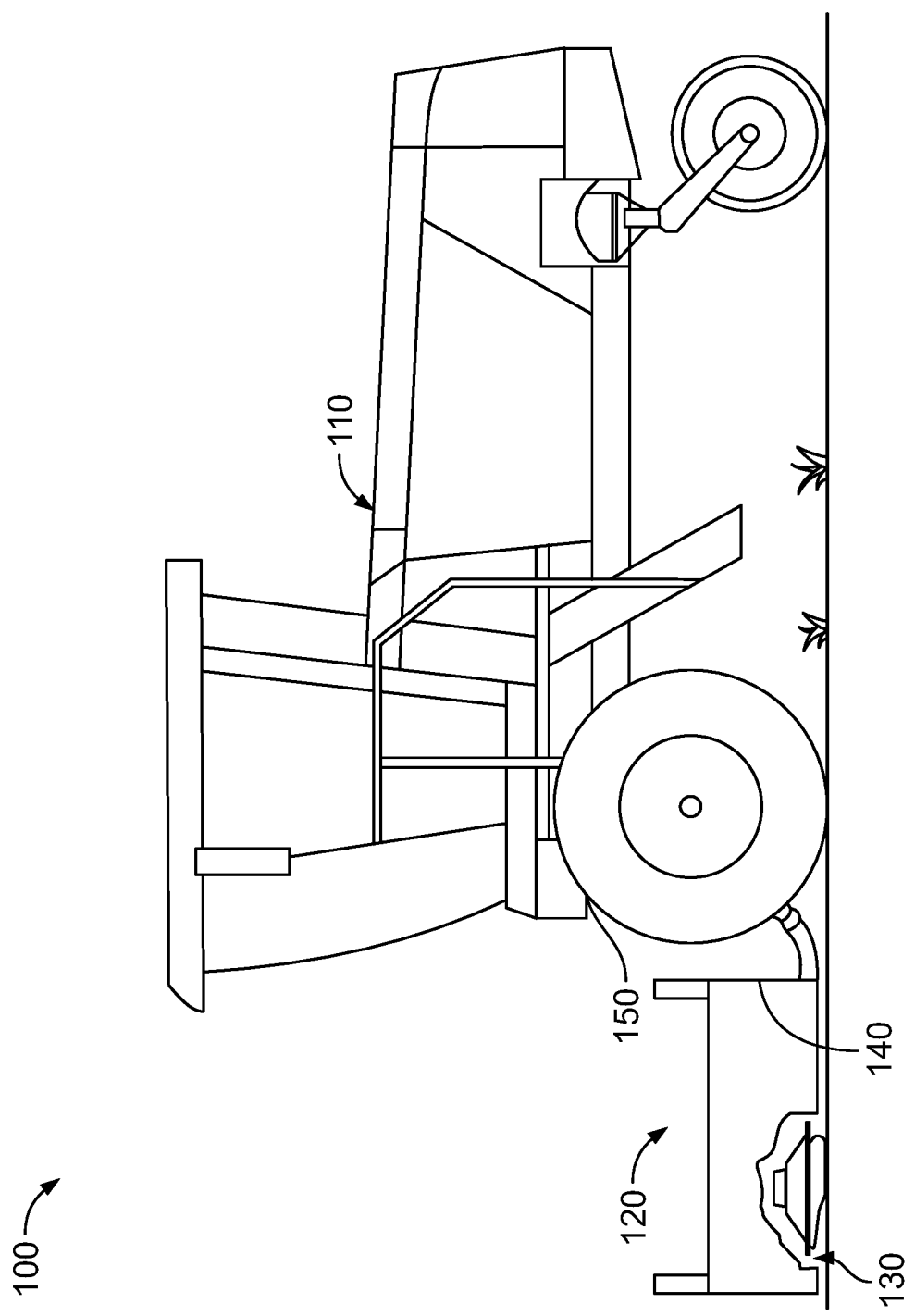
FIG. 1 is a side view of an exemplary embodiment of an agricultural vehicle carrying a header formed in accordance with the present disclosure.

Referring now to the drawings and particularly to FIG. 1, an exemplary embodiment of a self-propelled agricultural vehicle 100 including a tractor 110 carrying a forwardly disposed header 120 is illustrated. While the agricultural vehicle 100 is illustrated in the form of a self-propelled vehicle, in some embodiments the header 120 is included in a vehicle that is pulled or otherwise carried by, for example, a user or another vehicle. Such agricultural vehicles are well-known in the art for offering a way to sever crops or other plants. The header 120 includes a cutterbar 130 disposed adjacent the forward end of the header 120 to sever standings crop or other plants from the ground. The cutterbar 130 is carried by a header frame 140 that connects to a chassis 150 of the tractor 110 to allow the tractor 110 to push the header 120 across terrain. While the header 120 is illustrated as being pushed by the tractor 110, it should be appreciated that the header 120 operates similarly when pulled across terrain.

Figure 2:
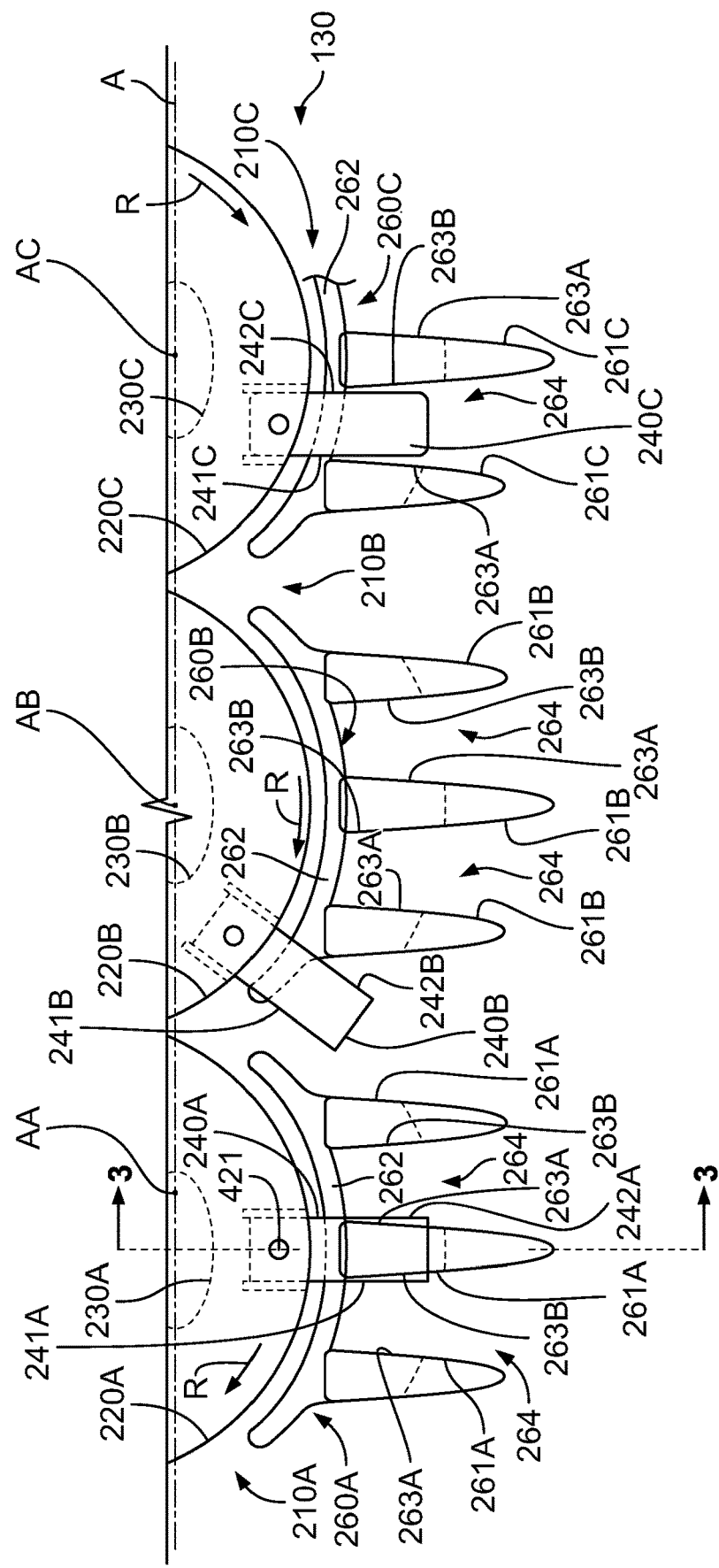
FIG. 2 is a top view of a portion of a cutterbar of the header shown in FIG. 1.

Referring now to FIG. 2, an exemplary embodiment of the cutterbar 130 is illustrated that includes a plurality of cutting units, with three cutting units 210A, 210B, 210C illustrated. It should be appreciated that while three cutting units 210A, 210B, 210C are illustrated, fewer than three cutting units, i.e., one or two cutting units, or more than three cutting units may be incorporated in the cutterbar 130. In some embodiments, the cutting units 210A, 210B, 210C are positioned side-by-side across a width of the header frame 140, and therefore the header 120, to sever crops or other plant material across the width of the header 120. Each of the cutting units 210A, 210B, 210C includes a respective rotatable disc 220A, 220B, 220C that can rotate about a respective axis of rotation AA, AB, AC when driven by one or more coupled rotary drivers, illustrated as three rotary drivers 230A, 230B, 230C. In some embodiments, the discs 220A, 220B, 220C have a rounded shape, e.g., a circular shape or an ellipsoid shape. While each of the rotatable discs 220A, 220B, 220C is illustrated as being coupled to a respective rotary driver 230A, 230B, 230C, in some embodiments multiple discs may be rotatably driven by a single rotary driver. In some embodiments, the respective axes of rotation AA, AB, AC are aligned with one another on an alignment axis A spanning the width of the header frame 140, with each axis AA, AB, AC extending generally vertically relative to the ground.

Figure 3:
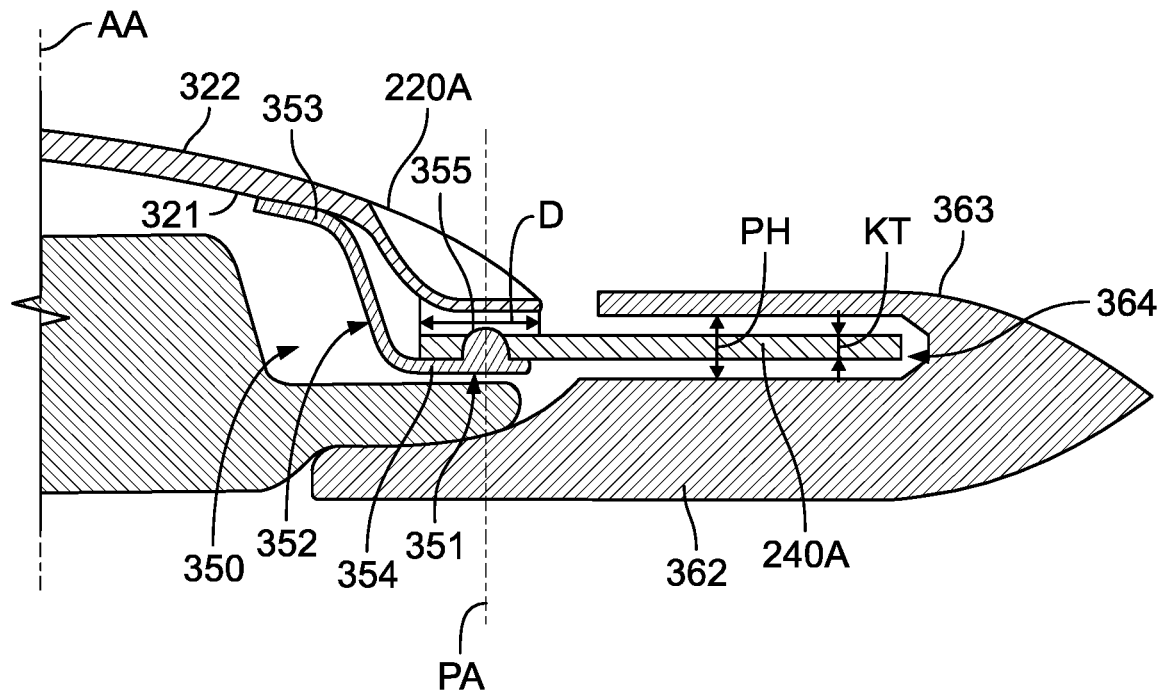
FIG. 3 is a cross-sectional view taken along line 3-3 in FIG. 2.
Figure 4:
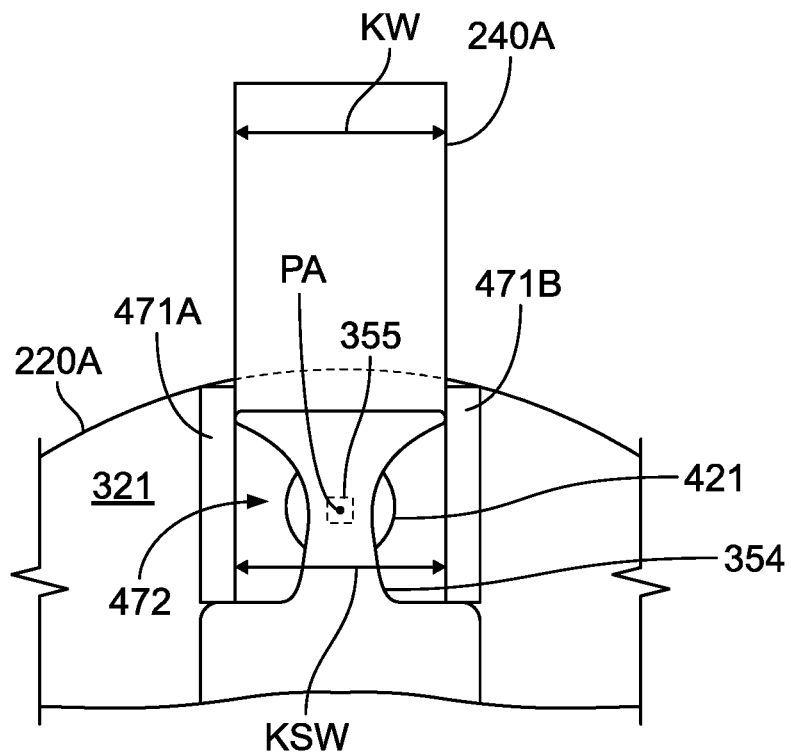
FIG. 4 is a bottom view of the portion of the cutterbar shown in FIG. 2.

To cut crop material, and referring now to FIGS. 3 and 4 as well, at least one of the rotatable discs 220A, 220B, 220C carries one or more knives 240A, 240B, 240C during rotation. In some embodiments, each of the discs 220A, 220B, 220C carries at least two knives 240A, 240B, 240C that are equally spaced apart from adjacent knives about the respective axis of rotation AA, AB, AC. Each of the knives 240A, 240B, 240C has at least one cutting edge 241A, 242A, 241B, 242B, 241C, 242C to sever crops, crop material, or other plant material during rotation of the discs 220A, 220B, 220C. In some embodiments, each of the knives 240A, 240B, 240C has two cutting edges 241A, 242A, 241B, 242B, 241C, 242C, as illustrated, to extend the usable life of the knives 240A, 240B, 240C, which is described further herein.

Referring specifically now to FIG. 3, an exemplary embodiment of a knife mount 350 for mounting a knife to the header 120 is illustrated. The knife mount 350 is coupled to a disc surface 321 of a disc, such as the disc 220A, so the disc 220A carries the knife mount 350 as the disc 220A rotates about its axis of rotation AA. It should be appreciated that while a single knife mount 350 is illustrated in FIG. 3, some or all of the rotatable discs 220A, 220B, 220C may have one or more knife mounts 350 coupled thereto for mounting knives 240A, 240B, 240C to the rotatable discs 220A, 220B, 220C. For example, in some embodiments one or more of the discs 220A, 220B, 220C will have two or more knife mounts 350 for mounting two or more knives 240A, 240B, 240C to the disc(s) 220A, 220B, 220C. The knife mount 350 includes a locking portion 351 that is biased toward the disc surface 321 to lock a knife, such as the knife 240A, in at least one direction. As illustrated in FIG. 3, for example, the locking portion 351 may lock the knife 240A in a pull-out direction, signified by arrow D, that extends radially relative to the axis of rotation AA so the knife 240A is not pulled away from the disc 220A while moving. In some embodiments, the locking portion 351 directly compresses the knife 240A against the disc surface 321 to lock the knife 240A. It should be appreciated that the knife 240A does not need to be compressed against the disc surface 321 to lock, as will be described further herein.

In some embodiments, the locking portion 351 is coupled to the disc surface 321, which may be a bottom surface of the disc 220A, by a deflectable portion 352 that is mounted to the disc surface 321 and connected to the locking portion 351. It should be appreciated that the locking portion 351 may be mounted to a top surface 322 of the disc 220A, rather than the bottom surface 321. In some embodiments, the deflectable portion 352 includes a mounting portion 353 that is rigidly mounted to the disc surface 321 and an elastic portion 354 that connects to the locking portion 351 and comprises, for example, spring steel or another elastic material that is biased toward the disc surface 321. In some embodiments, the elastic portion 354 is integrally formed with the locking portion 351 and the mounting portion 353 and, as illustrated in the FIG. 4, has a reduced width compared to the mounting portion 353.

In some embodiments, and referring again to FIGS. 3-4, the locking portion 351 includes a locking projection 355 that is sized to fit within a locking opening 421 formed in the knife 240A to lock the knife 240A in at least one direction. The locking projection 355 may have a round or other shape to define a pivoting axis, illustrated as axis PA in FIG. 3, that can allow pivoting of the knife 240A about the pivoting axis PA if the knife 240A is unconstrained. In some embodiments, the knife 240A may pivot up to 360° about the pivoting axis PA defined by the locking projection 355.

To protect the knives 240A, 240B, 240C and other components of the header 120 during operation, and referring specifically to FIGS. 2-3, each cutting unit 210A, 210B, 210C may include a guard assembly 260A, 260B, 260C held adjacent to the respective cutting disc 220A, 220B, 220C of the cutting unit 210A, 210B, 210C. Each guard assembly 260A, 260B, 260C may include a plurality of extensions 261A, 261B, 261C that extend from a base portion 262, which may be connected to a bottom of the cutterbar 130. Each guard assembly 260A, 260B, 260C may include a bottom portion 362 and a top portion 363 connected to the bottom portion 362 to define a knife passage 364 therebetween. The knife passage 364 is sized, shaped, and oriented such that the knives, such as knife 240A, are allowed to pass through the knife passage 364 during a full rotation of the disc 220A, 220B, 220C carrying the knives. To allow passage of the knives 240A, 240B, 240C through the knife passage 364, the knife passage 364 of each guard assembly 260A, 260B, 260C may be formed with a passage height PH that is greater than a knife thickness KT of the knives, such as knife 240A. In some embodiments, the passage height PH is between about 1.5 to about 2.0 times greater than the knife thickness KT of the knives that rotate through the knife passage. For example, in some embodiments the knife thickness KT of the knife 240A may be between about 1.5 mm and about 3.0 mm and the passage height PH may be between about 2.3 mm and about 6.0 mm. It should be appreciated that the previously described knife thickness and passage height values are exemplary only and may be modified depending on the desired cutting behavior of the knives.

During operation, each of the rotatable discs 220A, 220B, 220C may rotate about its respective axis of rotation AA, AB, AC and carry the respective knives 240A, 240B, 240C about the axis of rotation AA, AB, AC. As the knives 240A, 240B, 240C rotate, one of the cutting edges of each knife, such as cutting edges 241A, 241B, 241C, can engage and sever crop or other plant material. In some embodiments, the knives 240A, 240B, 240C are allowed to pivot about their respective pivoting axes PA, which may extend generally vertical relative to the ground.

When the cutting edges 241A, 241B, 241C initially engage material, which may be one or more plant stalks, the material will tend to deflect, i.e., bend, responsively. This deflection is more pronounced when the cut height is increased due to engagement between the cutting edges 241A, 241B, 241C and the plant material taking place further from the ground, where the plant material is supported. In some cases, the material engaged by the cutting edges 241A, 241B, 241C is also thinner, and thus more prone to bending, at greater heights from the ground. If the material being cut significantly bends when engaged by the cutting edges 241A, 241B, 241C, the cutting edges 241A, 241B, 241C may not cut the material evenly or cleanly.

As should be appreciated from FIG. 2, crop slots 264 may be defined between opposing ledger surfaces 263A, 263B of each of the extensions 261A, 261B, 261C along the width of the cutterbar 130. As the vehicle 100 travels through a field to sever crops or other plant material, standing plants tend to travel into and accumulate in the crop slots 264. The cutting edges 241A, 241B, 241C, which travel through a portion of the crop slots 264, engage accumulated material in the crop slots 264 as the knives 240A, 240B, 240C rotate with the discs 220A, 220B, 220C to sever the material. When the cutting edges 241A, 241B, 241C engage the material during rotation of the knives 240A, 240B, 240C, the material tends to bend in a direction of knife rotation, signified by arrow R. The ledger surface that is downstream from the material in the direction of knife rotation R, which may be the ledger surface 263A, counteracts the tendency of the material to bend by supporting the material during contact. The ledger surface 263A supporting the material allows the cutting edges 241A, 241B, 241C to cleanly and evenly cut through the material for a consistent cut. In this sense, the ledger surfaces 263A, 263B of the extensions 261A, 261B, 261C promote scissor-like cutting action by the knives 240A, 240B, 240C, similar to a reciprocating sickle-type cutter, as the knives 240A, 240B, 240C rotate.

In some embodiments, the extensions 261A, 261B, 261C, and thus the ledger surfaces 263A, 263B, comprise a metal, such as steel, that may be hardened by induction hardening, or otherwise, to reduce the effects of abrasive wear and increase the effective lifespan of the extensions 261A, 261B, 261C. In some embodiments, one or more of the ledger surfaces 263A, 263B may be coated with a high-strength material, such as tungsten carbide. To further promote scissor-like cutting action by the rotating knives 240A, 240B, 240C, one or more of the ledger surfaces 263A, 263B may be modified. In some embodiments, one or more of the ledger surfaces 263A, 263B are sharpened, i.e., beveled, or otherwise angled. In some embodiments, one or more of the ledger surfaces 263A, 263B is formed with serrations, which may be in addition to or an alternative to sharpening the ledger surface(s) 263A, 263B.

In known rotary-style cutters, the carried knives are generally free to pivot about their mounting points as they rotate with their respective discs. Due to the relatively high rotational speed of the knives and low height from the ground, such known rotary-style cutters experience little, if any, performance loss due to this pivoting because the knives cut through material, which is spread across the width of the cutterbar, relatively easily.

In a header including extensions with ledger surfaces for supporting crop or other plant material during cutting, such as exemplary embodiments of the header 120 disclosed herein, allowing the knives to freely pivot about their pivoting axes may detrimentally affect cutting performance. Particularly, as crop or other plant material accumulates in the crop slots 264, there is a relatively high density of material that is severed by each knife 240A, 240B, 240C during a full rotation of its respective disc 220A, 220B, 220C. The relatively high density of material substantially increases the resistance that the knives 240A, 240B, 240C experience during cutting, increasing the chance that one or more of the knives 240A, 240B, 240C will excessively pivot out of a position to engage and cut through the material. The knives 240A, 240B, 240C freely pivoting also increases the risk that the knives 240A, 240B, 240C pivot into a position where the knives 240A, 240B, 240C may contact one or more of the extensions 261A, 261B, 261C during operation.

In some embodiments, and referring again to FIG. 4, a pair of knife stops 471A, 471B are mounted to the disc surface 321 to define a knife slot 472 therebetween in order to minimize pivoting of the knives 240A, 240B, 240C. The locking portion 351 of the knife mount 350 may be biased toward the disc surface 321 such that the locking portion 351 at least partially resides in the knife slot 472 normally. A knife, such as knife 240A, may be held in the knife slot 472 between the knife stops 471A, 471B and locked by the locking portion 351. The locking portion 351 can prevent the knife 240A from being pulled in the pull-out direction D while the knife stops 471A, 471B substantially prevent the knife 240A from pivoting about its pivoting axis PA, which may be a vertical axis defined by the locking projection 355, or otherwise moving in a direction parallel to the disc surface 321. As used herein, the knife 240A is "substantially prevented" from pivoting in the sense that the knife 240A is free to pivot by no more than 1° clockwise or counterclockwise relative to its pivoting axis PA. The knife slot 472 may define a knife slot width KSW that is similar to a knife width KW of the knife 240A to limit the ability of the knife 240A to move during operation. In this respect, the disc surface 321, the locking portion 351, and the knife stops 471A, 471B can work in conjunction to rigidly lock the knife 240A to the disc 220A during rotation of the disc 220A so the knife 240A minimally translates or pivots, if at all, relative to the disc surface 321 during rotation. Thus, the knife stops 471A, 471B can allow the knives 240A, 240B, 240C to be pivotally locked as the discs 220A, 220B, 220C rotate to maintain the knives 240A, 240B, 240C in a generally fixed position relative to the guard assemblies 260A, 260B, 260C.

Figure 5:
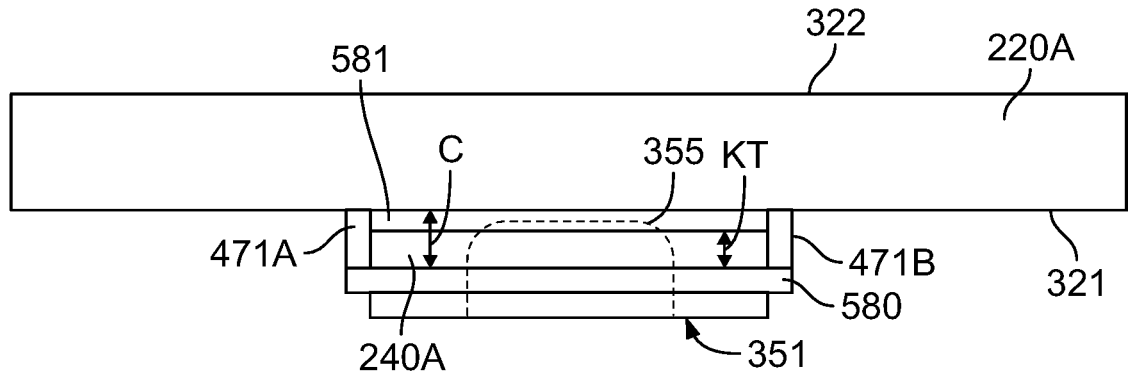
FIG. 5 is a front view of a disc illustrated in FIGS. 2-4 with a pair of knife stops and a support surface mounted thereto.

In some embodiments, and referring now to FIG. 5, a support surface 580 may be connected to one or both of the knife stops 471A, 471B to act as a vertical support for a knife, such as the knife 240A. The support surface 580 may also have a back surface 581 connected thereto that extends toward the disc surface 321 to act as a backstop, which will be described further herein. The support surface 580 defines a clearance C, relative to the disc surface 321, that may be slightly greater than the knife thickness KT of the knife 240A to limit the distance between the knife 240A and the disc surface 321, and thus the vertical tilting freedom of the knife 240A. To allow locking of the knife 240A by the locking portion 351, the support surface 580 may be formed with a through-hole that aligns with the locking opening 421 of the knife 240A when the knife 240A is properly oriented and allows at least a portion of the locking portion 351, such as the locking projection 355, to extend through both the through-hole and the locking opening 421 to lock the knife 240A.

Figure 6:
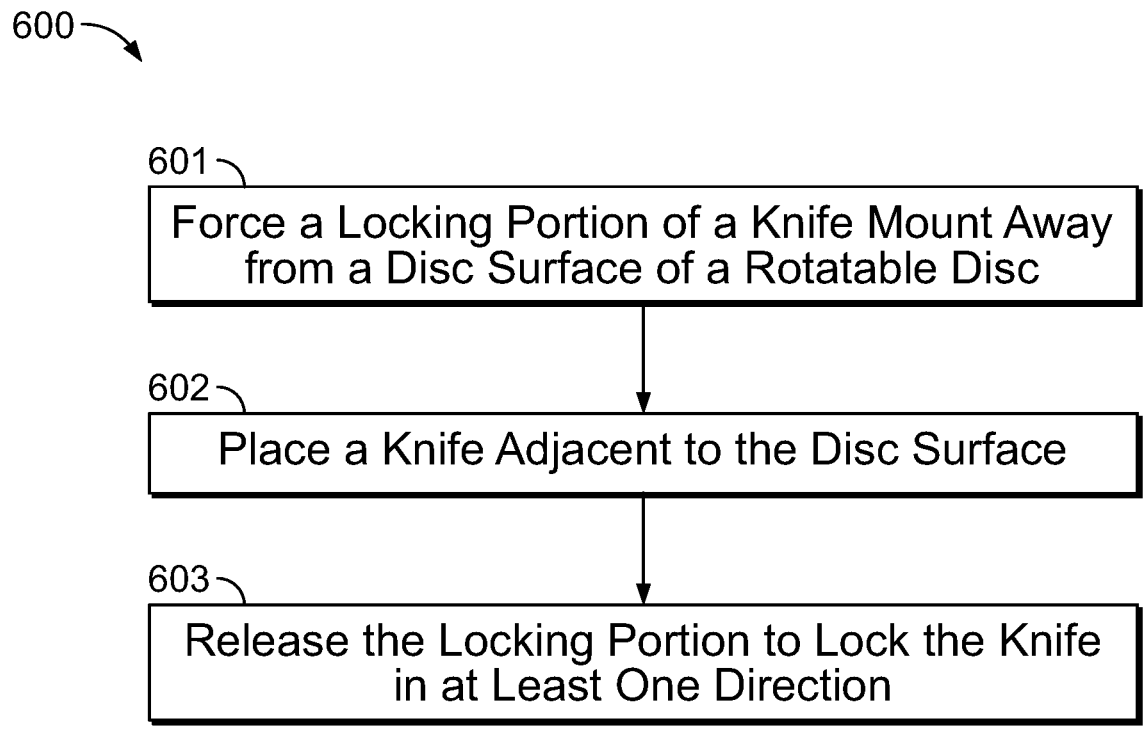
FIG. 6 is a flow chart illustrating an exemplary method of mounting a knife in a header in accordance with the present disclosure.

Referring now to FIG. 6, an exemplary embodiment of a method 600 for mounting a knife, such as the knife 240A, in a header, such as the header 120, is illustrated. The header 120 includes a rotatable disc, such as the rotatable disc 220A, and a knife mount, such as the knife mount 350, coupled to the rotatable disc 220A. The method 600 includes forcing 601 a locking portion 351 of the knife mount 350 away from a disc surface 321 of the rotatable disc 220A. The locking portion 351 is biased toward the disc surface 321 and thus resists being forced away from the disc surface 321. In some embodiments, the locking portion 351 may be forced away from the disc surface 321 by a user grasping and pulling the locking portion 351 away from the disc surface 321 or by a user using a tool to pry open the locking portion 351. In some embodiments, the locking portion 351 may be angled at its front such that pushing a surface, such as a portion of the knife 240A, against the front of the locking portion 351 forces the locking portion 351 away from the disc surface 321. The locking portion 351 may be biased toward the disc surface 321 by a deflectable portion 352, as previously described.

The method 600 further includes placing 602 the knife 240A adjacent to the disc surface 321 and releasing 603 the locking portion 351 such that the locking portion 351 travels toward the disc surface 321 and locks the knife 240A in at least one direction, such as a pull-out direction D. In some embodiments, placing 602 the knife 240A includes positioning the knife 240A in a knife slot 472 defined between a pair of knife stops 471A, 471B that are mounted to the disc surface 321. The knife 240A may be supported on its bottom by a support surface 580 and pushed into the knife slot 472 until the knife 240A contacts a back surface 581 connected to the support surface 580, which prevents further advancement of the knife 240A in the knife slot 472. The knife stops 471A, 471B substantially prevent pivoting of the knife 240A about a vertical pivoting axis PA, relative to the ground, when the knife 240A is positioned in the knife slot 472, as previously described. It should be appreciated that, after mounting the knife 240A, the knife 240A may be removed by forcing 601 the locking portion 351 away from the disc surface 321 and pulling the knife 240A away from the disc surface 321. The knife 240A may then be flipped so different cutting edges, such as cutting edges 242A, 242B, 242C, are utilized during operation or, alternatively, the knife 240A may be replaced by a new knife.

While exemplary embodiments have been described herein, it is expressly noted that these embodiments should not be construed as limiting, but rather that additions and modifications to what is expressly described herein also are included within the scope of the present disclosure. Moreover, it is to be understood that the features of the various embodiments described herein are not mutually exclusive and can exist in various combinations and permutations, even if such combinations or permutations are not made express herein, without departing from the spirit and scope of the present disclosure.

The invention claimed is:

1. An agricultural vehicle, comprising:
a chassis; and
a header carried by the chassis, the header including a cutterbar with at least one cutting unit, the at least one cutting unit including:
a rotary driver;
a rotatable disc coupled to the rotary driver;
at least one knife mount coupled to a disc surface of the rotatable disc and including a locking portion biased toward the disc surface;
a knife locked in at least one direction by the locking portion; and
a knife slot comprising a pair of knife stops mounted to the disc surface, and a support surface connected to one or both of the pair of knife stops, the knife being held in the knife slot.

2. The agricultural of claim 1, further
a guard assembly held adjacent to the rotatable disc and including a plurality of extensions, each of the extensions including a bottom portion and a top portion connected to the bottom portion to define a knife passage that allows the knife to rotate therethrough during a full rotation of the rotatable disc.

3. The agricultural vehicle of claim 2, wherein the at least one knife mount includes a deflectable portion mounted to the disc surface and connected to the locking portion.

4. The agricultural vehicle of claim 3, disc surface is a bottom surface of the rotatable disc.

5. The agricultural vehicle of claim 2, wherein the knife has a locking opening formed therein and the locking portion comprises a locking projection at least partially filling the locking opening.

6. The agricultural vehicle of claim 2, wherein the knife defines a knife thickness and the knife passage defines a passage height that is at least twice the knife thickness.

7. The agricultural vehicle of claim 1, wherein the support surface has a through-hole formed therein that allows at least a portion of the at least one knife mount to extend therethrough.

8. The agricultural vehicle of claim 1, further comprising a guard assembly held adjacent to the rotatable disc, the guard assembly including a plurality of extensions, each of the plurality of extensions having a bottom portion and a top portion connected to the bottom portion defining a passage height, wherein the passage height is about 1.5 to 2.0 times greater than a knife thickness of the knife.

9. The agricultural vehicle of claim 1, further comprising a guard assembly held adjacent to the rotatable disc, the guard assembly including a curved base portion and a plurality of extensions extending from the curved base portion.

10. A header for an agricultural vehicle, comprising:
a header frame;
a rotary driver carried by the header frame;
a rotatable disc coupled to the rotary driver;

at least one knife mount coupled to a disc surface of the rotatable disc and having a locking portion biased toward the disc surface to lock a knife in at least one direction; and a guard assembly held adjacent to the rotatable disc, the guard assembly including a curved base portion and a plurality of extensions extending from the base portion, each of the plurality of extensions including a bottom portion and a top portion connected to the bottom portion to define a knife passage.

11. The agricultural vehicle of claim 10, wherein the at least one knife mount includes a deflectable portion mounted to the disc surface and connected to the locking portion.

12. The agricultural vehicle of claim 11, wherein the disc surface is a bottom surface of the rotatable disc.

13. The agricultural vehicle of claim 10, wherein the locking portion includes a locking projection.

14. The agricultural vehicle of claim 10, further comprising a support surface connected to at least one of the knife stops, the support surface having a through-hole formed therein that allows at least some of the locking portion to extend therethrough.

15. A method of mounting a knife in a header for an agricultural vehicle, the header including a rotatable disc and a knife mount coupled to the rotatable disc, the method comprising:

forcing a locking portion of the knife mount away from a disc surface of the rotatable disc, the locking portion being biased toward the disc surface;

placing the knife adjacent to the disc surface and within a knife slot defined by a pair of stops and a support extending between the pair of stops; and releasing the locking portion such that the locking portion travels toward the disc surface and locks the knife in at least one direction.

16. A header for an agricultural vehicle, comprising:
a header frame;
a cutterbar mounted to the header frame, the cutterbar including
a cutting unit having:
a rotary driver;
a rotatable disc coupled to the rotary driver;
at least one knife mount coupled to a disc surface of the rotatable disc and including a locking portion biased toward the disc surface; and
a knife locked by the locking portion, the knife having a knife thickness, and
a guard assembly that includes a plurality of extensions, each of the plurality of extensions having a bottom portion and a top portion connected to the bottom portion defining a passage height,
wherein the passage height is about 1.5 to 2.0 times greater that the knife thickness.

17. The header of claim 16, wherein the cutting unit further comprises a knife slot that includes:
a pair of knife stops mounted to the disc surface, and
a support extending between and connected to at least one of the pair of knife stops, the knife being held in the knife slot.

18. The header of claim 17, wherein the guard assembly further comprises a curved base portion and the plurality of extensions extend from the base portion.

19. The header of claim 16, wherein the guard assembly further comprises a curved base portion and the plurality of extensions extend from the base portion.

20. The header of claim 16, wherein the locking portion further comprises a locking projection extending vertically and having an upper surface spaced from an upper surface of the knife.

* * * * *